D. F. GREEN.
LENS MOUNTING.
APPLICATION FILED JULY 25, 1911.
1,057,542.
Patented Apr. 1, 1913.
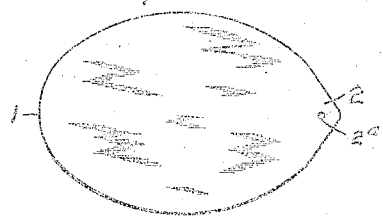
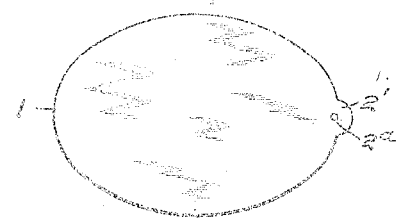
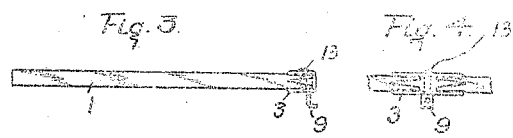
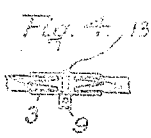
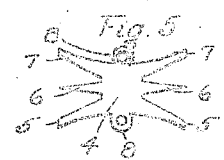
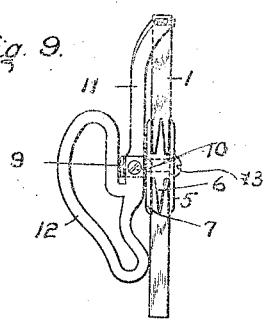
Inventor
Dallas F. Green
by Taylor & Hulse
his Attorneys
Witnesses
Isaac N. Taylor
W. A. Ellis

UNITED STATES PATENT OFFICE.

DALLAS F. GREEN, OF FORT WAYNE, INDIANA.

LENS-MOUNTING.

1,057,542.  Specification of Letters Patent.  Patented Apr. 1, 1913.

Application filed July 28, 1911. Serial No. 641,126.

*To all whom it may concern:*

Be it known that I, DALLAS F. GREEN, a citizen of the United States, residing at Fort Wayne, in the county of Allen and State of Indiana, have invented new and useful Improvements in Lens-Mountings, of which the following is a specification.

My present invention relates to improvements in lens mountings for frameless eyeglasses and spectacles wherein the mounting is secured to the lens by a stud screw which passes through a perforation in the lens. This type of mounting usually comprises a box mounted on a post which is adapted to receive and retain one end of the spring or bow and the guard, the post having two parallel ears which straddle the end of the lens and which are secured to the lens by a stud screw which passes through perforations in the ears and the lens. The post and box project inwardly from the edge of the lens and in substantially the longitudinal plane of the lens. The objections to this form of mounting are that an excessive proportion of the mounting is exposed to mar the appearance of the article, the size of the lens is necessarily materially reduced, the ears of the mounting project into the field of vision or field of the lens to such extent that the wearer is annoyed thereby, and as the ears of the mounting are the only portions of the mounting which engage the front and rear surfaces of the lens there is ever present the danger of fracture of the lens from strains or shocks adjacent the stud screw.

The object of my invention is to provide a simple and efficient form of mounting for lenses which shall have an exceedingly small part thereof projecting into the field of the lens or field of vision, which shall have means to reinforce the lens adjacent the stud screw perforation and which shall be so constructed that the spring or bow and guard are carried in the rear of the lens, thereby greatly improving the usefulness, efficiency and appearance of the eyeglasses or spectacles, and enabling me to materially increase the size of the lens.

My invention consists in the novel combination, construction and arrangement of parts hereinafter set forth, one embodiment of which is illustrated in the accompanying drawings, in which drawings—

Figure 1 is a view of one form of lens adapted for use with my lens mounting; Fig. 2, a view of another form of lens for a similar purpose; Fig. 3 an edge view of a lens with my mounting secured in place; Fig. 4 an end view of Fig. 3; Fig. 5, a view of the blank from which the mounting is formed; Fig. 6, a side view of the mounting as formed from the blank; Fig. 7, a plan view of one form of box which supports the guard and spring or bow; Fig. 8, a side view of Fig. 7; and Fig. 9, an enlarged view of a lens equipped with my mounting and showing a guard and spring supported thereon.

Referring to the drawings, 1 is a lens having an extension 2 or 2' of suitable form at one or both ends; 2ª is an opening in the lens which is arranged so that its periphery would touch or very closely approach the oval end or edge of the lens were projection 2 or 2' not present on the lens.

3 is a box which is preferably stamped or struck up in blank form from a single piece of sheet metal, or other suitable material, as shown in Fig. 5. The blank consists of a plate 4 having three projections 5, 6 and 7 extending from two opposite edges, and perforated ears 8 projecting from opposite ends, one of the perforations being threaded. The central projections 6 are preferably tapered as shown and the inner edges of projections 5 and 7 extend inwardly toward the adjacent edges of projections 6 so as to leave tapered openings or slots between the same. The outer edges of projections 5 and 7 are given, substantially, the curvature of the oval of the lens proper—the oval of the inner end of the lens disregarding the extension 2 or 2'. The blank is then bent to conform to the contour of the edge of extension 2 or 2' on the lens, and projections 5 and 7 and the adjacent portions of plate 4, together with ears 8 are bent into parallel relation and at right angles to the plane of the central portion of plate 4. A socket or box 9 of suitable form is secured, as by soldering, to plate 4 adjacent one of the ears 8, and preferably adjacent the ear 8 having the threaded perforation, or the box 9 may be integral with box 3.

In Figs. 7 and 8 I show box 9 in L form. The long arm or broad side of the box is provided with an opening, and a screw 10 is in threaded engagement with said arm or side in said opening. Screw 10 also passes through a suitable opening in one extremity of bow or bridge 11 and through an opening in the shank of nose guard 12, the bow and guard being thereby rigidly secured to the box. When so secured the edges of the bow and shank abut the short arm or side of box 9 and the rear side of box 3.

It will be seen that box 9 is wholly in the rear of box 3 and that no portion of it projects into the field of vision of the lens nor beyond the outer edge of box 3. In attaching box 3 to the lens, screw 13 is inserted through the perforated ears 8 and the opening in the lens and is tightened to draw the several prongs of the box into close engagement with the front and rear surfaces and edge of the lens. Prongs 5 and 7, which engage the front and rear surfaces of the projection of the lens, are resilient and form an elastic brace or support for reinforcing that portion of the lens, which portion is adjacent the stud screw opening, and prongs 6 which engage the edge of the projection on the lens form a brace for the box on that edge and prevent peripheral movement of the box thereon.

It is now apparent that by my mounting an exceedingly small portion of the field of the lens is occupied by the same; that the extension on the lens is substantially covered by the mounting and that the support for the spring and guard is entirely in the rear of the lens and does not project into the field of the lens nor beyond the end of the lens box 3.

What I claim is:

1. The combination with a lens having an opening therein, and having an extension at one end outside the field of vision thereof, of a mounting for the lens having a portion engaging the edge of the lens and having resilient lateral projections adapted to engage opposite surfaces of the lens extension to reinforce the lens outside the field of vision thereof, perforated ears carried by the projections, and a stud screw operative in the lens opening and perforated ears to draw the projections and ears into engagement with the lens.

2. The combination with a lens having an opening therein, and having an extension at one end outside the field of vision of the lens, of a mounting for the lens having a portion thereof adapted to engage the edge of the lens extension, and having lateral resilient projections thereon adapted to engage opposite surfaces of said lens extension, perforated ears carried by the projections and a stud screw operative in the lens opening and the perforated ears to draw the mounting and its lateral projections into contact with the lens extension, the outer edges of the projections substantially coinciding with the edge of the lens extension and the inner edges of the same substantially coinciding with the periphery of the lens proper.

3. The combination with a perforated lens having an extension at one end thereof, which projects outside the field of vision of the lens, of a mounting for the lens comprising a box having prongs adapted to engage the edge of the extension and having lateral projections and perforated ears adapted to engage opposite surfaces of the extension, the box having a second box projecting from the rear side of the same, and a stud screw operative in the lens perforation and perforated ears for securing the mounting to the lens.

4. The combination with a perforated lens having an extension at one end thereof which projects outside the field of vision of the lens, of a mounting for the lens comprising a box having prongs adapted to engage the edge of the extension and having lateral projections and perforated ears adapted to engage opposite surfaces of the extension, and a stud screw operative in the lens perforation and perforated ears for securing the mounting to the lens.

In witness whereof I hereunto sign my name in the presence of two witnesses.

DALLAS F. GREEN.

Witnesses:
 ISAAC H. TAYLOR,
 ELWIN D. HULSE.